United States Patent
Sanjeev (10) Patent No.: US 8,649,828 B1
(45) Date of Patent: Feb. 11, 2014

(54) AUTOMATED MANAGEMENT OF POWER CONSUMPTION BY MOBILE COMMUNICATION DEVICE

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 264 days.

(21) Appl. No.: 12/881,773

(22) Filed: Sep. 14, 2010

(51) Int. Cl.
*H04B 1/38* (2006.01)

(52) U.S. Cl.
USPC ............................................... 455/574

(58) Field of Classification Search
USPC .................................. 455/572–574
See application file for complete search history.

(56) References Cited

U.S. PATENT DOCUMENTS

| | | | | |
|---|---|---|---|---|
| 7,136,680 B2* | 11/2006 | Leizerovich et al. | .......... | 455/574 |
| 2008/0168290 A1* | 7/2008 | Jobs et al. | ..................... | 713/324 |
| 2008/0254822 A1* | 10/2008 | Tilley | ......................... | 455/550.1 |
| 2010/0226298 A1* | 9/2010 | Chan et al. | ..................... | 370/311 |
| 2010/0265179 A1* | 10/2010 | Ram | ............................. | 345/163 |

\* cited by examiner

*Primary Examiner* — Steven Lim (57) ABSTRACT

A mobile communication device may include a wireless communication system, a power-consuming subsystem, a source of power, a usage detector, and a power management system. The power-consuming subsystem may be a subsystem other than a display system and the wireless communication system. The usage detector may be configured to detect when the mobile communication device is and/or is not being actively used by a user. The power management system may be configured to remove power from the power-consuming subsystem when the usage detector detects that the mobile communication device is not being actively used by a user. The power management system may be configured to thereafter reapply power to the power-consuming subsystem in response to detection by the usage detector that the mobile communication device is being actively used by a user.

27 Claims, 4 Drawing Sheets

AUTOMATED MANAGEMENT OF POWER CONSUMPTION BY MOBILE COMMUNICATION DEVICE

BACKGROUND

1. Technical Field

This disclosure relates to power management in mobile communication devices, such as in smart cell phones.

2. Description of Related Art

Mobile communication devices may contain various subsystems that consume substantial power, in addition to a wireless communication system and a display. Smart phones, for example, may contain a WiFi transceiver, GPS receiver, and/or a Bluetooth transceiver. These power-consuming subsystems can add significantly to battery drain and hence hasten the time when the battery charge will no longer be sufficient.

One or more of these power-consuming subsystems may often not be in active use, but may still needlessly drain power. Many users are unaware of the significant power which these subsystems can drain from their mobile communication devices and hence may do nothing to address this problem. Other users may know about the drain which these subsystems can impose, but may not have the time or discipline to disable them when they are not needed and to then re-enable them when they are needed. So this problem may remain even with knowledgeable users. This problem may grow in significance as mobile communication devices include more of these power-consuming subsystems.

SUMMARY

A mobile communication device may include a wireless communication system, a power-consuming subsystem, a source of power, a usage detector, and a power management system. The power-consuming subsystem may be a subsystem other than a display system and the wireless communication system. The usage detector may be configured to detect when the mobile communication device is and/or is not being actively used by a user. The power management system may be configured to remove power from the power-consuming subsystem when the usage detector detects that the mobile communication device is not being actively used by a user. The power management system may be configured to thereafter reapply power to the power-consuming subsystem when the usage detector detects that the mobile communication device is again being actively used by a user.

The power-consuming subsystem may be a WiFi transceiver, a GPS receiver, and/or a Bluetooth transceiver. The mobile communication device may include a user interface configured to allow a user to select the power-consuming subsystem.

The usage detector may include a movement detector configured to detect when the mobile communication device is and/or is not in motion. The movement detector may include a GPS system and/or an accelerometer. The power management system may be configured to remove power from the power-consuming subsystem when the movement detector detects that the mobile communication device has not been in motion for a pre-determined period. The power management system may be configured to thereafter reapply power to the power-consuming subsystem when the movement detector detects that the mobile communication device is again in motion.

The usage detector may include a keyboard usage detector configured to detect when a keyboard is and/or is not in use. The power management system may be configured to remove power the power-consuming subsystem when the keyboard usage detector detects that the keyboard has not been in use for a pre-determined period. The power management system may be configured to thereafter reapply power to the power-consuming subsystem when the keyboard usage detector detects that the keyboard is again in use.

The usage detector may include a touch screen usage detector configured to detect when a touch screen is and/or is not touched. The power management system may be configured to remove power from the power-consuming subsystem when the touch screen usage detector detects that the touch screen has not been touched for a pre-determined period and/or has been continuously touched for a pre-determined period. The power management system may be configured to thereafter reapply power to the power-consuming subsystem when touch screen usage detector detects that the touch screen is again touched and/or that touching of the touch screen has stopped.

The usage detector may include a docking station detector configured to detect when the mobile communication device is and/or is not docked at a docking station. The power management system may be configured to remove power from the power-consuming subsystem when the docking station detector detects that the mobile communication device is docked at the docking station. The power management system may be configured to thereafter reapply power to the power-consuming subsystem when the docking station detector detects that the mobile communication device is again undocked from the docking station.

The usage detector may include an orientation sensor configured to detect the orientation of the mobile communication device. The power management system may be configured to remove power from the power-consuming subsystem when the orientation sensor detects that the mobile communication device is approximately at a particular orientation for a pre-determined period. The particular orientation may be when a display in the mobile communication device faces downwardly. The power management system may be configured to thereafter reapply power to the power-consuming subsystem when the orientation sensor detects that the mobile communication device is no longer approximately at the particular orientation.

The usage detector may be configured to detect when the mobile communication device is and/or is not being actively used by the user based on a plurality of detected criteria.

The mobile communication device may include a user interface configured to allow a user to select one or more conditions which the usage detector is configured to detect to determine when the mobile communication device is and/or is not being actively used by the user.

The power management system may be configured to allow power to continue to be supplied to the wireless communication system following detection by the usage detector that the mobile communication device is not being actively used by a user.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
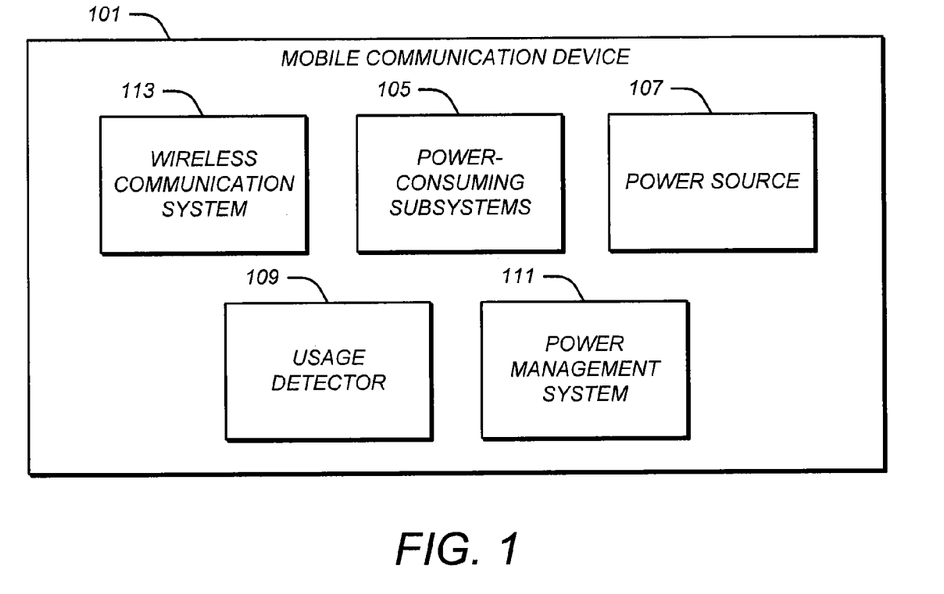
FIG. 1 illustrates an example of a mobile communication device with automated power management.

FIG. 1 illustrates an example of a mobile communication device 101 with automated power management. As illustrated in FIG. 1, the mobile communication device 101 may include a wireless communication system 103, power-consuming subsystems 105, a power source 107, a usage detector 109, and a power management system 111.

The mobile communication device 101 may be of any type. For example, the mobile communication device may consist of or include a smart phone and/or a laptop computer.

The wireless communication system 103 may be configured to wirelessly transmit and receive communications, such as voice, multimedia, data, emails, and/or instant messages.

Figure 2:
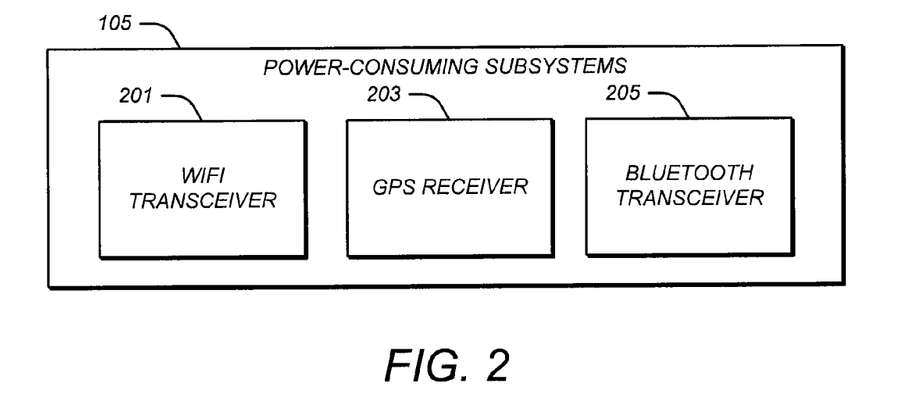
FIG. 2 illustrates examples of the power-consuming subsystems illustrated in FIG. 1.

FIG. 2 illustrates examples of the power-consuming subsystems 105 illustrated in FIG. 1. As illustrated in FIG. 2, the power-consuming subsystems 105 may include or consist of a Wi-Fi transceiver 201, a GPS receiver 203, and/or a Bluetooth transceiver 205. They may not include the wireless communication system or a display system which may be part of the mobile communication device 101.

Returning to FIG. 1, the power source 107 may be of any type. For example, the power source 107 may consist of or include one or more batteries, which may be rechargeable. The power source 107 may be configured to power the wireless communication system 103, a display system, the power-consuming subsystems 105, and other devices and circuits.

The usage detector 109 may be configured to detect when the mobile communication device 101 is and/or is not being actively used by a user. The criteria which is considered by the usage detector 109 for detecting when the mobile communication device 101 is not being actively used by a user may be the same as or different than the criteria used when detecting that the mobile communication device 101 is being actively used by a user.

The power management system 111 may be configured to remove power from the power-consuming subsystems 105 when the usage detector 109 detects that the mobile communication device 101 is not being actively used by a user. The power management system 111 may be configured to allow power to continue to be supplied to the wireless communication system 103 and/or to a display system following detection by the usage detector 109 that the mobile communication device 101 is not being actively used by a user. The power management system 111 may be configured to reapply power to the power-consuming subsystems 105 when the usage detector detects that the mobile communication device 101 is again being actively used by a user.

Figure 3:
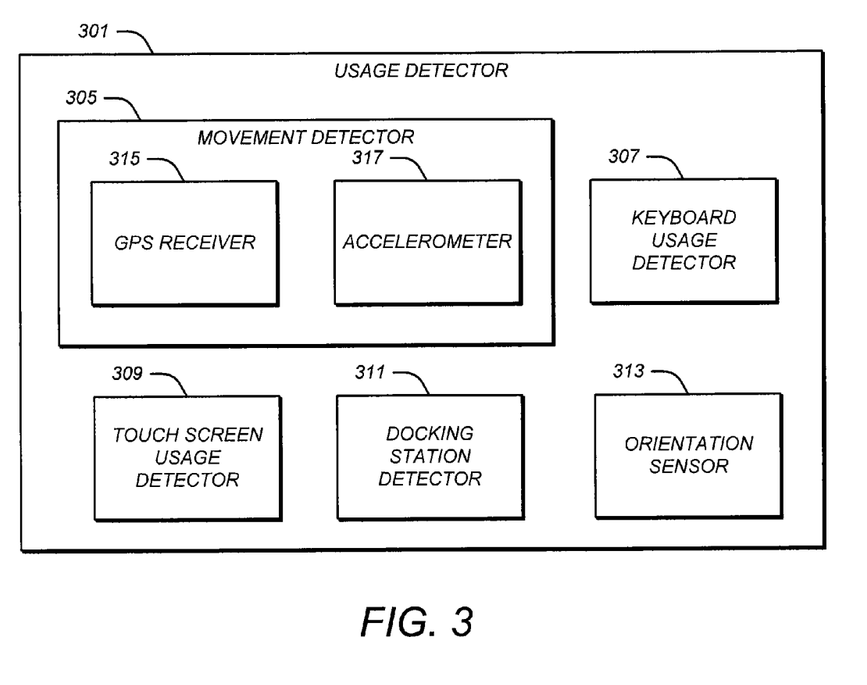
FIG. 3 illustrates an example of the usage detector illustrated in FIG. 1.

FIG. 3 illustrates an example of the usage detector 301 illustrated in FIG. 1. The usage detector 301 may be used in any other type of mobile communication device. Similarly, the mobile communication device 101 may use a usage detector which is different from the usage detector 301 illustrated in FIG. 3.

As illustrated in FIG. 3, the usage detector 301 may include a movement detector 305, a keyboard usage detector 307, a touch screen usage detector 309, a docking station detector 311, and an orientation sensor 313. The usage detector 301 may include additional detection components and/or not all of the detection components illustrated in FIG. 3.

The movement detector 305 may be configured to detect when the mobile communication device is and/or is not in motion. The movement detector 305 may include or consist of any device to achieve this purpose. For example, the movement detector 305 may include or consist of a GPS receiver 315 and/or an accelerometer 317.

The keyboard usage detector 307 may be configured to detect when a keyboard is and/or is not in use. The touch screen usage detector 309 may be configured to detect when a touch screen is and/or is not being touched. The docking station detector 311 may be configured to detect when the mobile communication device 101 is and/or is not docked at a docking station.

The orientation sensor 313 may be configured to detect the orientation of the mobile communication device. An accelerometer or other type of orientation sensor may be used for this purpose.

The power management system 111 may be configured to remove power from one or more of the power-consuming subsystems 105 when the movement detector 305 detects that the mobile communication device 101 has not been in motion for a pre-determined period, when the keyboard usage detector 307 detects that the keyboard has not been in use for a pre-determined period, when the touch screen usage detector 309 detects that the touch screen has not been touched for a pre-determined period, when the touch screen usage detector 309 detects that the touch screen has been continuously touched for a pre-determined period (indicating that the display may be resting upside down against a surface), when the docking station detector 311 detects that the mobile communication device is docked at a docking station, and/or when the orientation sensor 313 detects that the mobile communication device 101 is approximately at a particular orientation (e.g., horizontal and upside down, indicating that the mobile communication is likely to be resting on a surface) for a pre-determined period.

Each of the pre-determined periods may be in any amount. They may be in an amount which minimizes the chance that the detection which is associated with the pre-determined period is not a false indication of non-active use. The amounts may be subject to user selection through a user interface.

For example, a vehicle in which a cell phone is being used may stop temporarily at a red light. To avoid a false indication of non-active use, the pre-determined period that is associated with the movement detector 305 may be several minutes, such as 3, 4, 5, or 10 minutes.

Similarly, a user may temporarily stop pressing keys and/or the touch screen, even though the mobile communication device is still in active use. Thus, the pre-determined periods which are associated with these detectors may similarly be several minutes, such as 3, 4, 5, or 10 minutes.

There may be no pre-determined period which is associated with the docking station detector 311. Generally, mobile communication devices are not actively used after they are docked.

The pre-determined period which is associated with the orientation sensor 313 may also be selected to avoid a false indication of non-active use merely because the mobile communication device 101 is temporarily oriented at the particular orientation. Again, the pre-determined period may be several minutes, such as 3, 4, 5, or 10 minutes.

The power management system 111 may be configured to reapply power to one or more of the power-consuming subsystems 105 when the movement detector 305 detects that the mobile communication device 101 is again in motion, when the keyboard usage detector 307 detects that the keyboard is again in use, when the touch screen usage detector 309 detects that the touch screen is again in use, when the touch screen usage detector 309 detects that the touch screen is no longer being touched (and thus, for example, that the touch screen is no longer in contact with the flat surface), when the docking station detector 311 detects that the mobile communication device 101 is undocked from the docking station, and/or when the orientation sensor 313 detects that the mobile communication device is no longer approximately at the particular orientation.

One or more of these criteria for reapplying power to one or more of the power-consuming subsystems 105 may also be required to exist for a pre-determined period before the power is reapplied. And, again, these pre-determined periods may be in any amount and may be settable through a user interface. They may be selected to ensure against a false indication that the mobile communication device 101 is again being actively used.

For example, detection of motion in the wireless mobile communication device 101 may merely be the result of the device being moved from one room in a home to another, not the result of it again being actively used by a user. Thus, a pre-determined period may be applied to the motion detection which may again be several minutes, such as 3, 4, 5, or 10 minutes. The pre-determined period in connection with a change in orientation may similarly be several minutes, such as 3, 4, 5, or 10 minutes.

On the other hand, no pre-determined period may be associated with the detection of keyboard usage and/or touch screen usage, as these are generally not activated unless the mobile communication device 101 is being actively used by a user.

The power management system 111 may be configured to require more than one of the conditions which have been described to exist before removing power from and/or reapplying power to one or more of the power-consuming subsystems 105. For example, the power management system 111 may be configured to require an absence of motion, key strokes, and screen touches for a pre-determined period before removing power. Any combination of these and/or other conditions may be required.

The various conditions which the power management system 111 may require before removing power from and/or reapplying power to one or more of the power-consuming subsystems 105 may be settable by a user of the mobile communication device 101 through a user interface.

Figure 4:
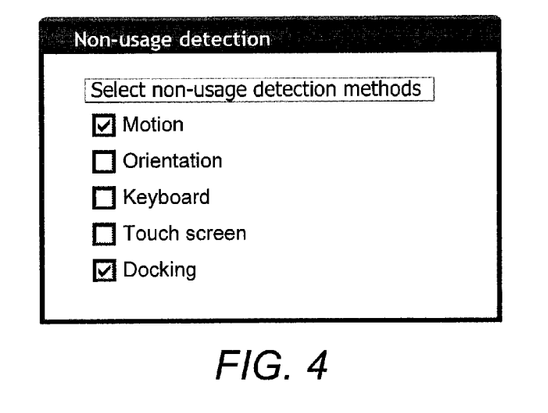
FIG. 4 illustrates an example of a dialog box in which a user may select the methods to be used by the usage detector illustrated in FIG. 1 to detect the non-use of a mobile communication device by a user.

FIG. 4 illustrates an example of a dialog box in which a user may select the methods to be used by the usage detector 109 to detect the non-use of a mobile communication device by a user. The power management system 111 may be configured to require all of the selected methods or any of the selected methods before removing power from one or more of the power-consuming subsystems 105. Although not illustrated in FIG. 4, the required logical relationship between multiple selected methods may itself be the subject of user-selection(s).

Figure 5:
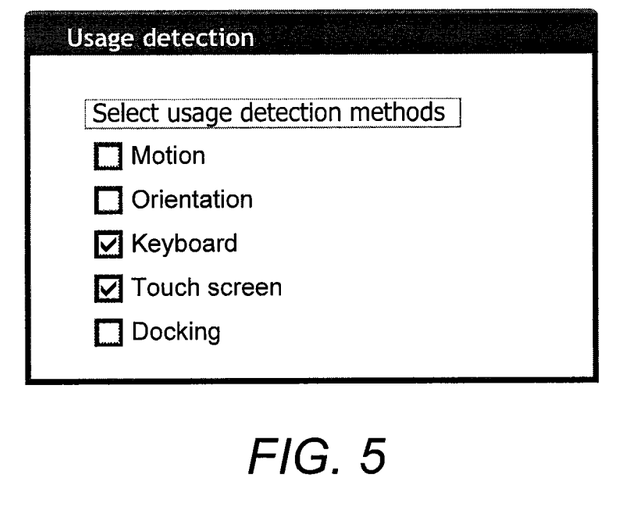
FIG. 5 illustrates an example of a dialog box in which a user may select the methods to be used by the usage detector illustrated in FIG. 1 to detect the use of a mobile communication device by a user.

FIG. 5 illustrates an example of a dialog box in which a user may select the methods to be used by the usage detector 109 to detect use of a mobile communication device by a user. The power management system 111 may be configured to require all of the selected methods or any of the selected methods before reapplying power to one or more of the power-consuming subsystems 105. Although not illustrated in FIG. 4, the required logical relationship between multiple selected methods may itself be the subject of user-selection(s).

As illustrated by a comparison of FIGS. 4 and 5, the criteria which is examined by the power management system 111 when determining when to remove power (based on detection of non-usage) may be different than the criteria which is examined for determining when to reapply power (based on the detection of usage).

The power-consuming subsystems 105 which are controlled by the power management system 111 may themselves be the subject of user selection through a user interface.

Figure 6:
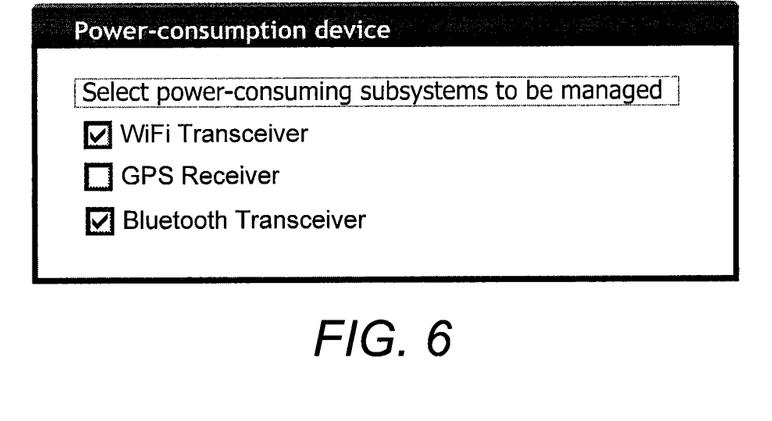
FIG. 6 illustrates an example of a dialog box in which a user may select the power-consuming subsystems which are to be managed by the power management system illustrated in FIG. 1.

FIG. 6 illustrates an example of a dialog box in which a user may select the power-consuming subsystems 105 which are to be managed by the power management system illustrated in FIG. 1. Although not illustrated in FIG. 6, the power-consuming subsystems 105 from which the power management system 111 may be programmed to remove power may be different than the subsystems to which the power management system 111 may be programmed to reapply power.

Figure 7:
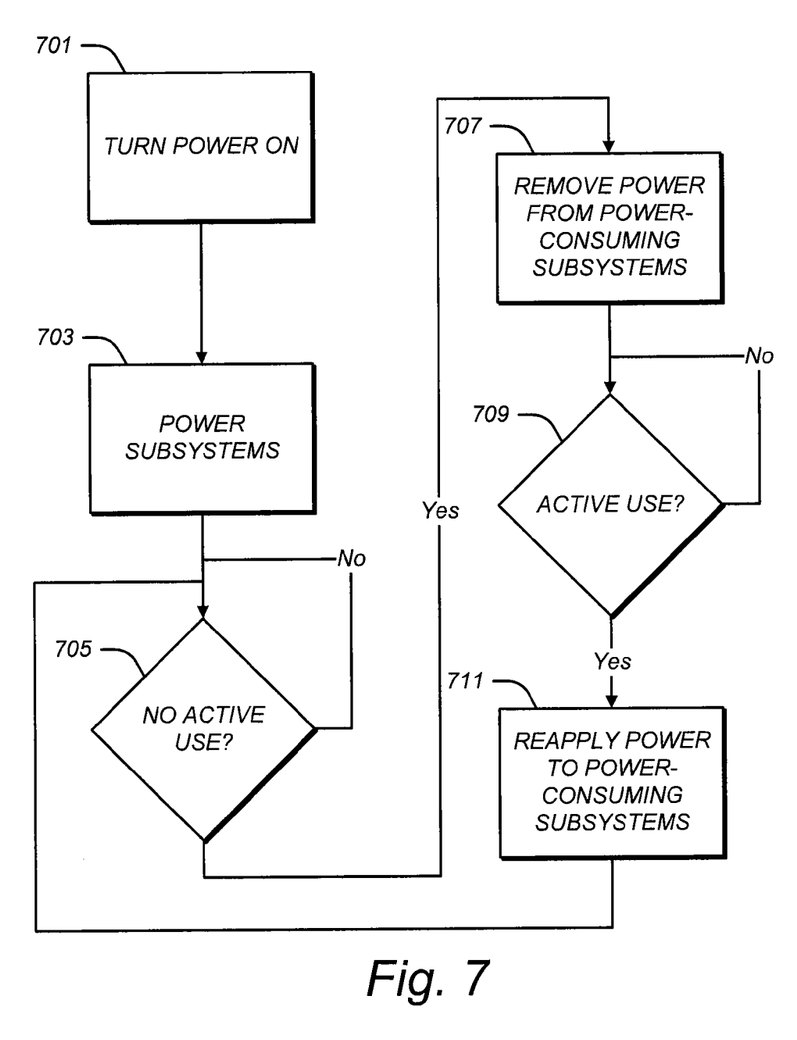
FIG. 7 illustrates a power management process which the mobile communication device illustrated in FIG. 1 may implement.

FIG. 7 illustrates a power management process which the mobile communication device 101 illustrated in FIG. 1 may implement. A different mobile communication device may also implement this process. Similarly, the mobile communication device 101 may implement a different process.

The power management process may begin by applying power to the mobile communication device 101, as reflected by a Turn Power On step 701. This may be accomplished by a user pressing a button on the mobile communication device 101 and/or through other means.

The power-consuming subsystems 105 which have been configured to receive power may also be activated, as reflected by a Power Subsystems step 703.

Thereafter, the usage detector 109 may detect when the mobile communication device 101 is not being actively used by a user, as reflected by a No Active Use? decision step 705.

Once the usage detector 109 detects that the mobile communication device 101 is not being actively used by a user, the power management system 111 may be configured to remove power from one or more of the power-consuming subsystems 105, as reflected by a Remove Power From Power-Consuming Subsystems step 707.

Thereafter, the usage detector 109 may be configured to detect when the mobile communication device 101 is again being actively used by a user, as reflected by an Active Use? decision step 709.

Once this is detected, the power management system 111 may be configured to reapply power to one or more of the power-consuming subsystems 105, as reflected by a Reapply Power to Power-Consuming Subsystems step 711.

The usage detector 109 may then again detect when the mobile communication device 101 is not being actively used by a user, as reflected in the No Active Use? Decision step 705.

This section of the process may then repeat indefinitely, as indicated by FIG. 7.

The various components, devices, systems, and subsystems which have been described may be constructed from electronic hardware and may further include software, all configured to cause the respective components, devices, systems, and subsystems to perform the functions as recited herein, as well as other functions. Electronic hardware may include one or more microprocessors, computer memories, user interface devices, and/or network interface devices.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the usage detector may be configured to detect when the mobile communication device is in active use by detecting whether an application in the mobile communication device is running, even if the mobile communication device is not being touched or moved.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A mobile communication device comprising:
a display system;
a wireless communication system, wherein the wireless communication system:
includes a keyboard or a touch screen, and
is configured to wirelessly transmit and receive voice communications, multimedia communications, data communications, email communications, and/or instant message communications;
a power-consuming subsystem, other than the display system and other than the wireless communication system;
a source of power for the display system, the wireless communication system and the power-consuming subsystem;
a usage detector configured to detect when the mobile communication device is not being actively used by a user; and
a power management system configured to remove power from the power-consuming subsystem while allowing power to continue to be supplied to the wireless communication system when the usage detector detect that the mobile communication device is not being actively used by a user.

2. The mobile communication device of claim 1 wherein:
the usage detector includes a movement detector configured to detect when the entire mobile communication device is not in motion; and
the power management system is configured to remove power from the power-consuming subsystem when the movement detector detects that the entire mobile communication device has not been in motion for a pre-determined period.

3. The mobile communication device of claim 2 wherein the movement detector includes a GPS system and/or an accelerometer.

4. The mobile communication device of claim 1 wherein:
the wireless communication system includes the keyboard;
the usage detector includes a keyboard usage detector configured to detect when the keyboard is not in use; and
the power management system is configured to remove power from the power-consuming subsystem when the keyboard usage detector detects that the keyboard has not been in use for a pre-determined period.

5. The mobile communication device of claim 1 wherein:
the wireless communication system includes the touch screen;
the usage detector includes a touch screen usage detector configured to detect when the touch screen is not touched; and
the power management system is configured to remove power from the power-consuming subsystem when the touch screen usage detector detects that the touch screen has not been touched for a pre-determined period.

6. The mobile communication device of claim 1 wherein:
the wireless communication system includes the touch screen;
the usage detector includes a touch screen usage detector configured to detect when the touch screen is touched; and the power management system is configured to remove power from the power-consuming subsystem when the touch screen usage detector detects that the touch screen has been continuously touched for a pre-determined period.

7. The mobile communication device of claim 1 wherein:
the usage detector includes a docking station detector configured to detect when the mobile communication device is docked at a docking station; and
the power management system is configured to remove power from the power-consuming subsystem when the docking station detector detects that the mobile communication device is docked at the docking station.

8. The mobile communication device of claim 1 wherein:
the usage detector includes an orientation sensor configured to detect the orientation of the mobile communication device; and
the power management system is configured to remove power from the power-consuming subsystem when the orientation sensor detects that the mobile communication device is approximately at a particular orientation for a pre-determined period.

9. The mobile communication device of claim 8 wherein the mobile communication device includes a display and the particular orientation is when the display faces downwardly.

10. The mobile communication device of claim 1 wherein the usage detector is configured to detect when the mobile communication device is not being actively used by the user based on a plurality of detected criteria.

11. The mobile communication device of claim 1 further comprising a user interface configured to allow a user to select at least one condition which the usage detector is configured to detect to determine when the mobile communication device is not being actively used by the user.

12. The mobile communication device of claim 1 further comprising a user interface configured to allow a user to select the power-consuming subsystem.

13. The mobile communication device of claim 1 wherein:
the usage detector is configured to detect when the mobile communication device is being actively used by a user; and
the power management system is configured to reapply power to the power-consuming subsystem in response to detection by the usage detector that the mobile communication device is being actively used by a user, following detection by the usage detector that the mobile communication device is not being actively used by a user.

14. The mobile communication device of claim 13 wherein:
the usage detector includes a movement detector configured to detect when the mobile communication device is in motion; and
the power management system is configured to reapply power to the power-consuming subsystem when the movement detector detects that the mobile communication device is in motion.

15. The mobile communication device of claim 13 wherein:
the wireless communication system includes the keyboard;
the usage detector includes a keyboard usage detector configured to detect when the keyboard is in use; and
the power management system is configured to reapply power to the power-consuming subsystem when the keyboard usage detector detects that the keyboard is in use.

16. The mobile communication device of claim 13 wherein:
the wireless communication system includes the touch screen;
the usage detector includes a touch screen usage detector configured to detect when the touch screen is touched; and
the power management system is configured to reapply power to the power-consuming subsystem when touch screen usage detector detects that the touch screen is touched.

17. The mobile communication device of claim 13 wherein:
the usage detector includes a docking station detector configured to detect when the mobile communication device is undocked from a docking station; and
the power management system is configured to reapply power to the power-consuming subsystem when the docking station detector detects that the mobile communication device is undocked from the docking station.

18. The mobile communication device of claim 13 wherein:
the usage detector includes an orientation sensor configured to detect the orientation of the mobile communication device; and
the power management system is configured to reapply power to the power-consuming subsystem when the orientation sensor detects that the mobile communication device is no longer approximately at a particular orientation.

19. The mobile communication device of claim 18 wherein the display system includes a display and the particular orientation is when the display faces downwardly.

20. The mobile communication device of claim 13 wherein the usage detector is configured to detect when the mobile communication device is being actively used by the user based on a plurality of detected criteria.

21. The mobile communication device of claim 13 further comprising a user interface configured to allow a user to select at least one condition which the usage detector is configured to detect to determine when the mobile communication device is being actively used by the user.

22. The mobile communication device of claim 1 wherein:
the usage detector is configured to detect when the mobile communication device is and is not being actively used, and
criteria considered by the usage detector for detecting when the mobile communication device is not being actively used is able to be different than criteria used when detecting that the mobile communication device is being actively used.

23. The mobile communication device of claim 1 wherein criteria for determining when to remove power is able to be different than criteria for determining when to reapply power.

24. The mobile communication device of claim 1 wherein the power-consuming subsystem from which the power management system is programmed to remove power is able to be different than a power-consuming subsystem to which the power management system is programmed to reapply power.

25. The mobile communication device of claim 1 wherein the power-consuming subsystem comprises a wireless receiver or transceiver, other than the wireless communication system configured to wirelessly transmit and receive communications.

26. The mobile communication device of claim 25 wherein the wireless receiver or transceiver of the power-consuming subsystem is a WiFi transceiver, a GPS receiver, or a Bluetooth transceiver.

27. A mobile communication device of comprising:
- a wireless communication system, wherein the wireless communication system includes a touch screen;
- a power-consuming subsystem, other than a display system and the wireless communication system;
- a source of power for the wireless communication system and the power-consuming subsystem;
- a usage detector configured to detect when the mobile communication device is not being actively used by a user and configured to detect when the mobile communication device is being actively used by a user, wherein the usage detector includes a touch screen usage detector configured to detect when touching of the touch screen has stopped; and
- a power management system configured to remove power from the power-consuming subsystem while allowing power to continue to be supplied to the wireless communication system when the usage detector detects that the mobile communication device is not being actively used by a user, wherein the power management system is configured to reapply power to the power-consuming subsystem in response to detection by the usage detector that the mobile communication device is being actively used by a user, following detection by the usage detector that the mobile communication device is not being actively used by a user, by reapplying power to the power-consuming subsystem when the touch screen usage detector detects that touching of the touch screen has stopped.

* * * * *